Figure 3:
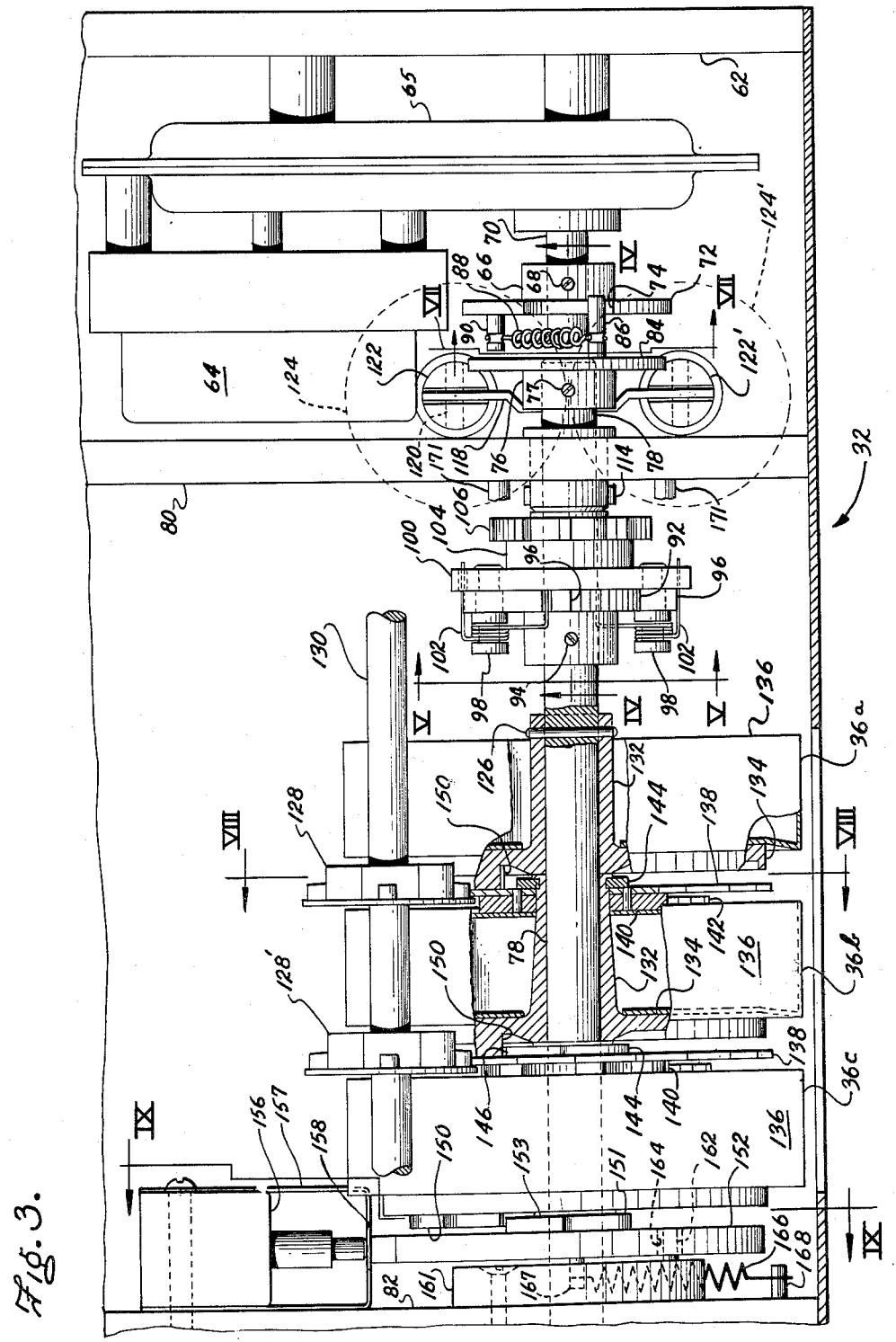

March 27, 1962  E. D. RAPISARDA  3,027,048
LIQUID DISPENSING APPARATUS AND REMOTE REGISTER MEANS THEREFOR
Filed April 20, 1959  8 Sheets-Sheet 1
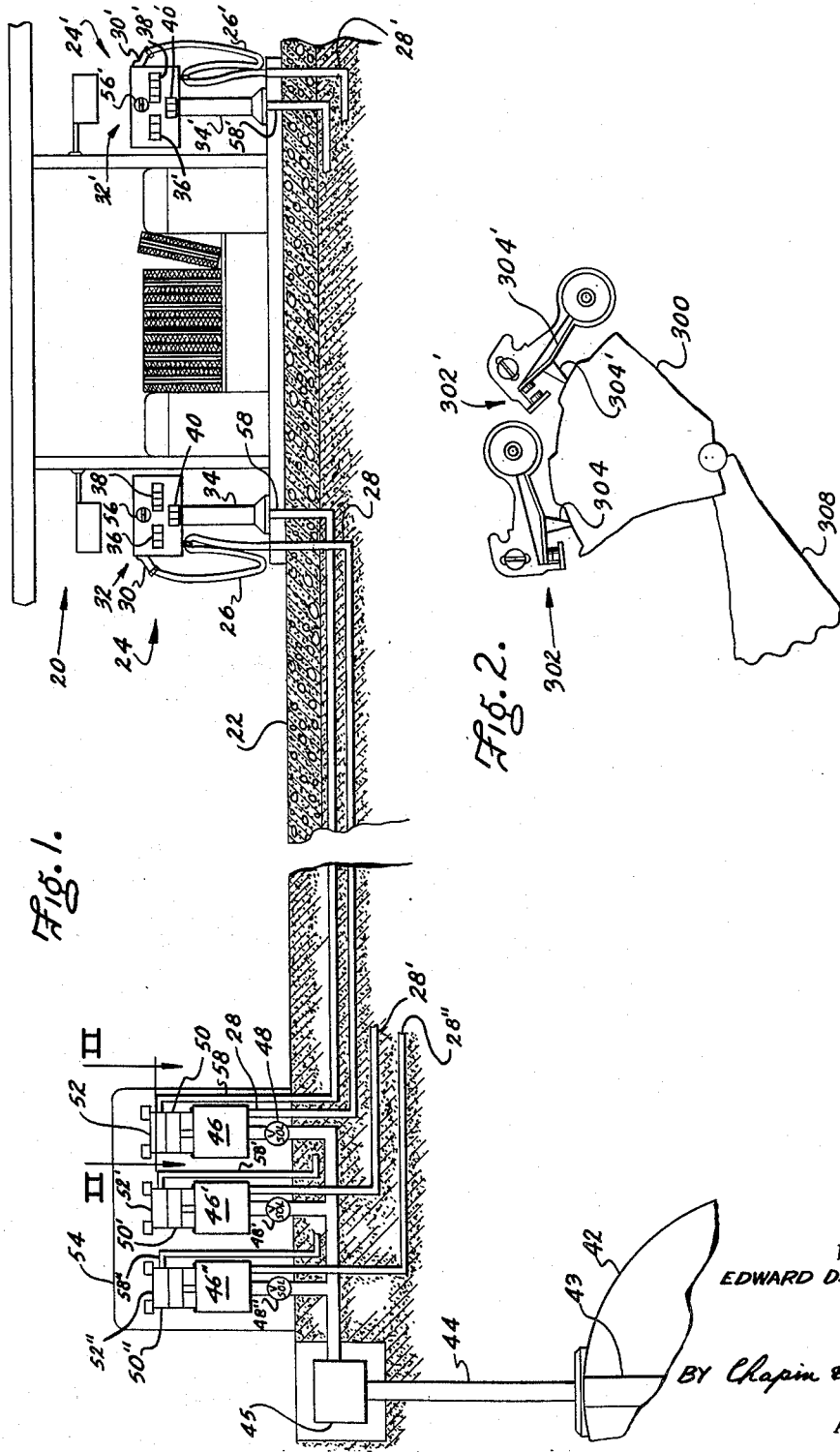
INVENTOR
EDWARD D. RAPISARDA
BY Chapin & Neal
ATTORNEYS March 27, 1962 E. D. RAPISARDA 3,027,048
LIQUID DISPENSING APPARATUS AND REMOTE REGISTER MEANS THEREFOR
Filed April 20, 1959 8 Sheets-Sheet 3

INVENTOR
EDWARD D. RAPISARDA

BY Chapin & Neal

ATTORNEYS

INVENTOR
EDWARD D. RAPISARDA

BY Chapin & Neal

ATTORNEYS

March 27, 1962  E. D. RAPISARDA  3,027,048
LIQUID DISPENSING APPARATUS AND REMOTE REGISTER MEANS THEREFOR
Filed April 20, 1959  8 Sheets-Sheet 5
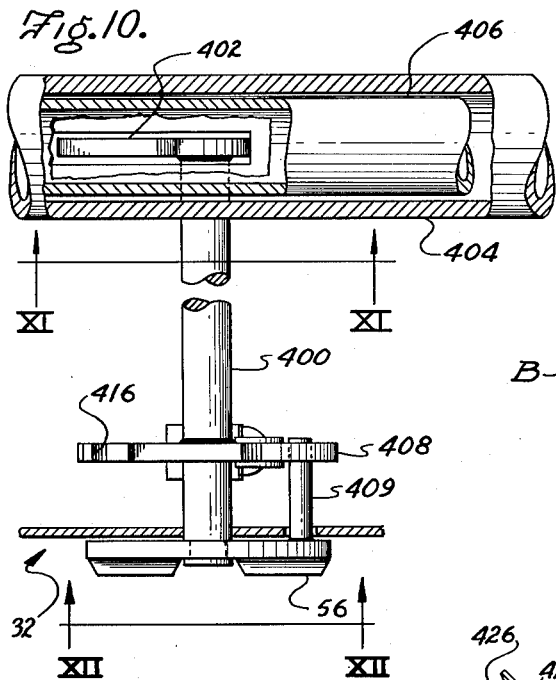
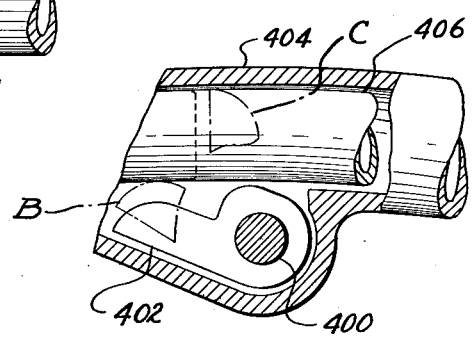
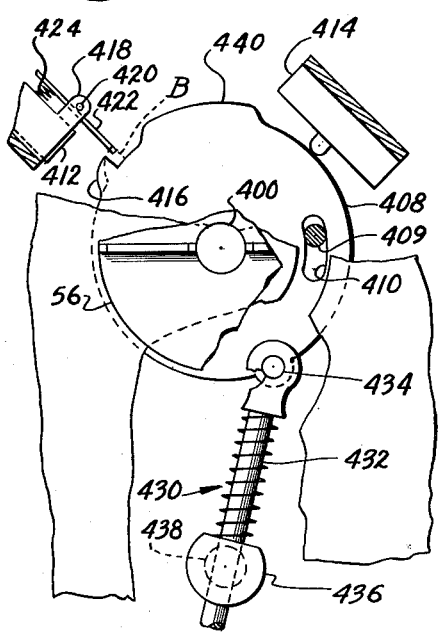
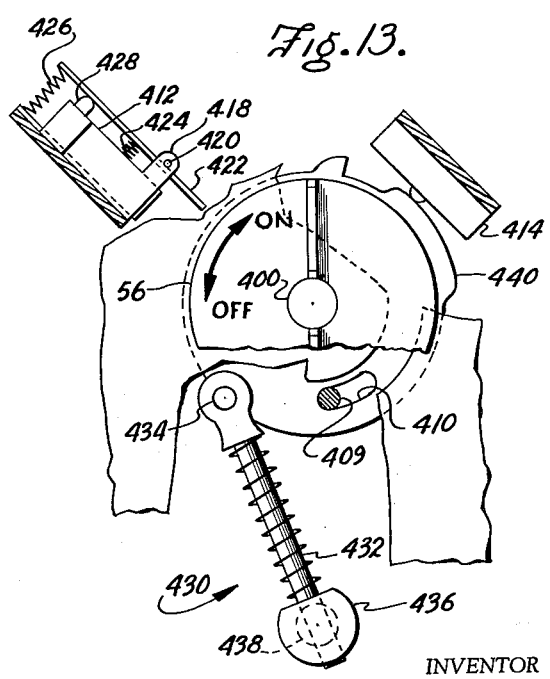
INVENTOR
EDWARD D. RAPISARDA
BY Chapin & Neal
ATTORNEYS March 27, 1962  E. D. RAPISARDA  3,027,048
LIQUID DISPENSING APPARATUS AND REMOTE REGISTER MEANS THEREFOR
Filed April 20, 1959  8 Sheets-Sheet 7

INVENTOR
EDWARD D. RAPISARDA
BY Chapin & Neal
ATTORNEYS

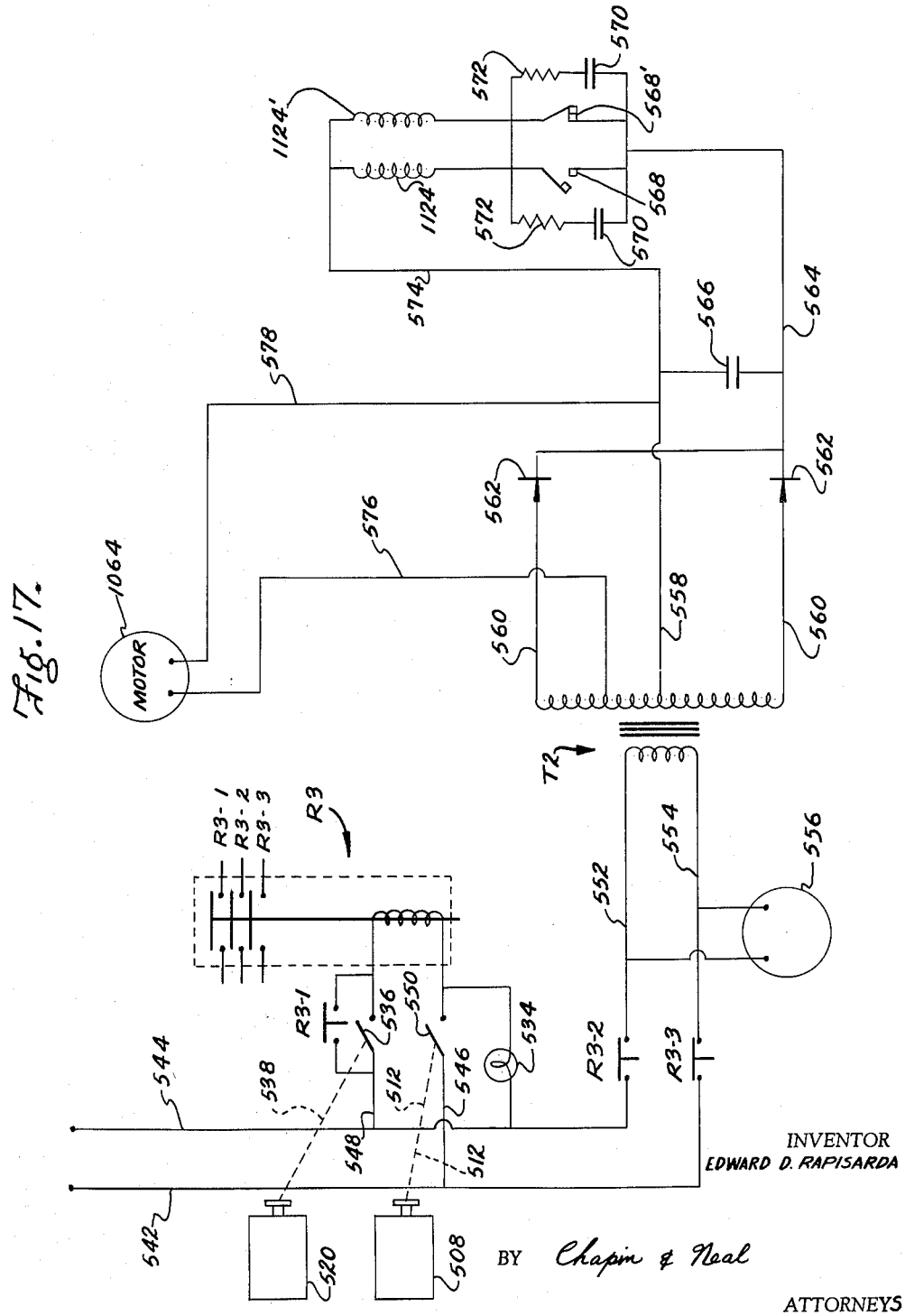

United States Patent Office 3,027,048
Patented Mar. 27, 1962

3,027,048
LIQUID DISPENSING APPARATUS AND REMOTE
REGISTER MEANS THEREFOR
Edward D. Rapisarda, West Springfield, Mass., assignor to Gilbert & Barker Manufacturing Company, West Springfield, Mass., a corporation of Massachusetts
Filed Apr. 20, 1959, Ser. No. 807,509
23 Claims. (Cl. 222—35)

The present invention relates to improvements in liquid dispensing apparatus and more particularly to improvements in the operation of registers or counters for indicating the volume and/or price of liquid delivered, having in mind the special requirements for the sale of gasoline and like petroleum products.

One object of the invention is to provide improved liquid dispensing apparatus having a volume indicating counter or register remote from a meter or the like which measures the volume of liquid dispensed with means for conforming operation of the register to that of the meter characterized in that such means is simple and economical to manufacture and has a high degree of reliability and accuracy over a long period of continued use.

To this end there is provided apparatus comprising a meter in a liquid delivery line and a register for indicating the amount or price of liquid delivered. The register is located at a point remote from the meter and is provided with means constantly tending to drive the indicator wheels of the register. Also means are provided for restraining rotation of the register wheels, which means are movable to permit incremental rotation of said wheels in response to means controlled by said meter and proportionate to the rate of liquid delivered. The register may therefore be located at any point desired. It will also be apparent that in its broader aspects the conforming means is not necessarily limited to liquid dispensing apparatus but is applicable to any art where it is desired to have a register at a point remote from means for measuring or indicating a condition such as flow rate, height of a variable liquid surface or the like.

Another object of the invention is to accomplish the above ends and to further provide for zeroing of the register in a simple and effective manner preferably with the provision of safeguards for preventing a subsequent delivery of liquid prior to the register having been zeroed.

A further object of the invention is to provide improved means, which include a single control knob, for controlling operation of such apparatus and having particular utility in combination with the remote register conforming means hereof.

Yet another object of the invention is to provide improved apparatus for remotely controlling or monitoring a liquid dispensing unit and preferably employing register conforming means provided in accordance with the above ends.

The above and other related objects and facts of the invention will be apparent from a reading of the following description of the disclosure found in the accompanying drawings and the particular novelty thereof pointed out in the appended claims.

Figure 4:
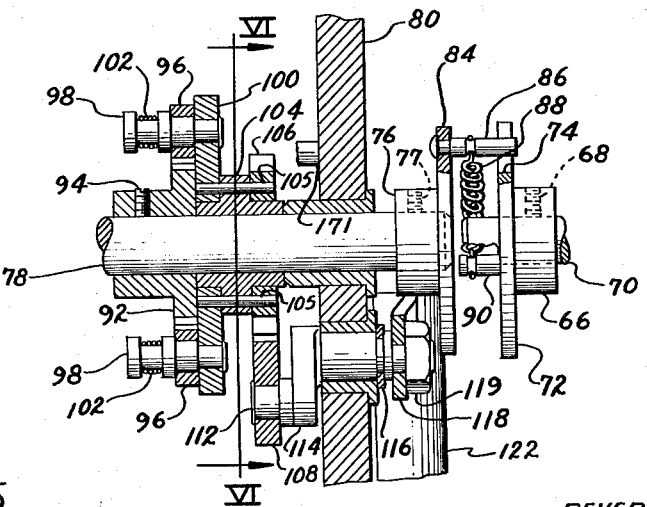
Figure 5:
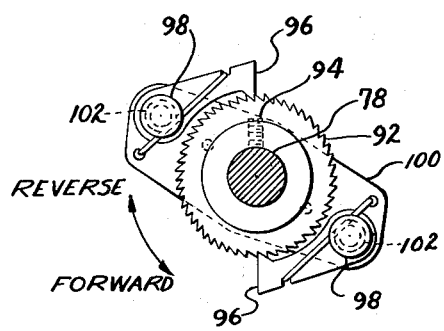
Figure 6:
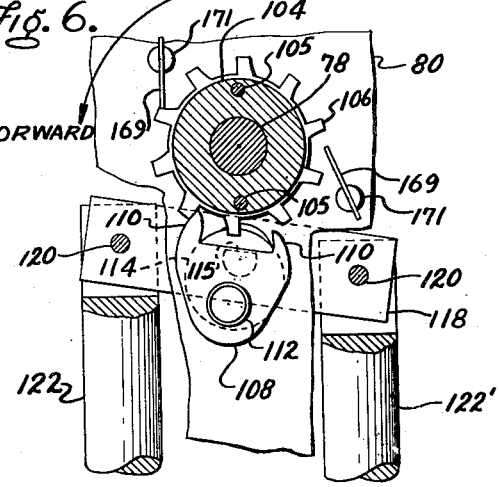
Figure 7:
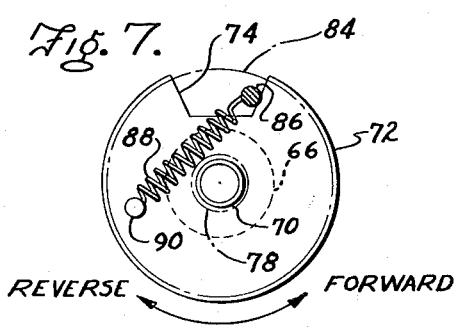
Figure 8:
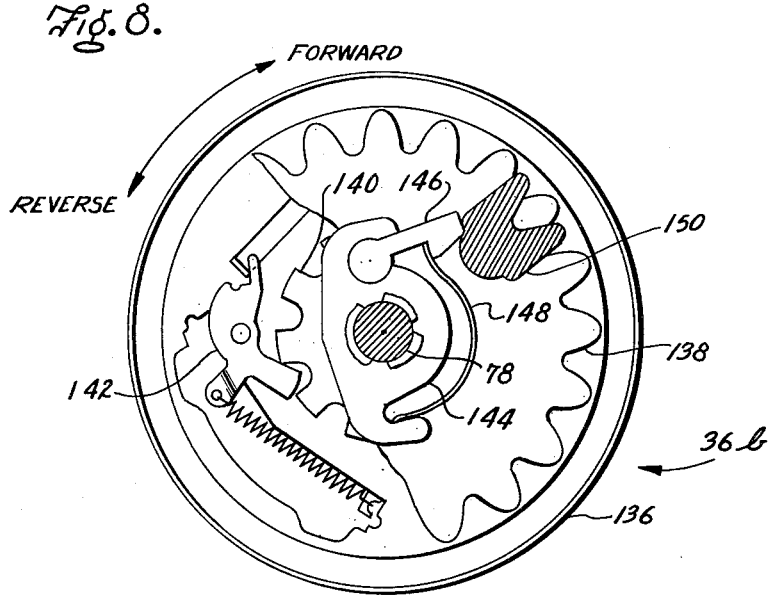
Figure 9:
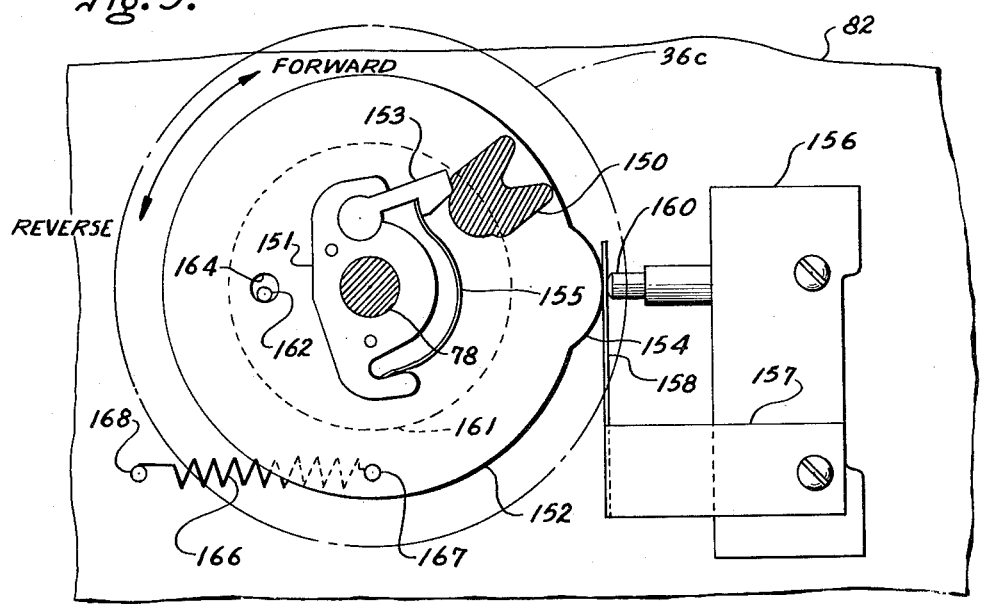
Figure 14:
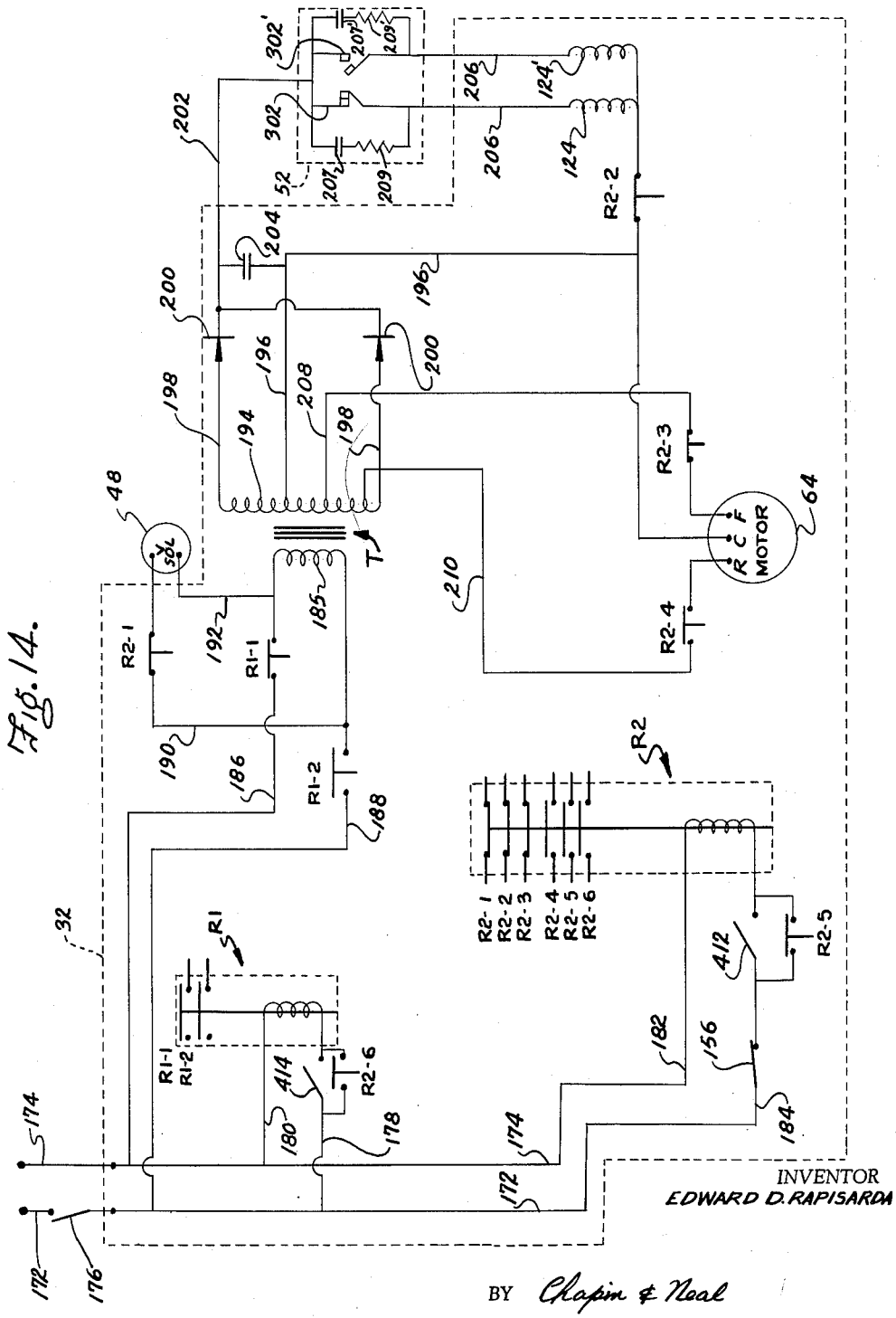
Figure 15:
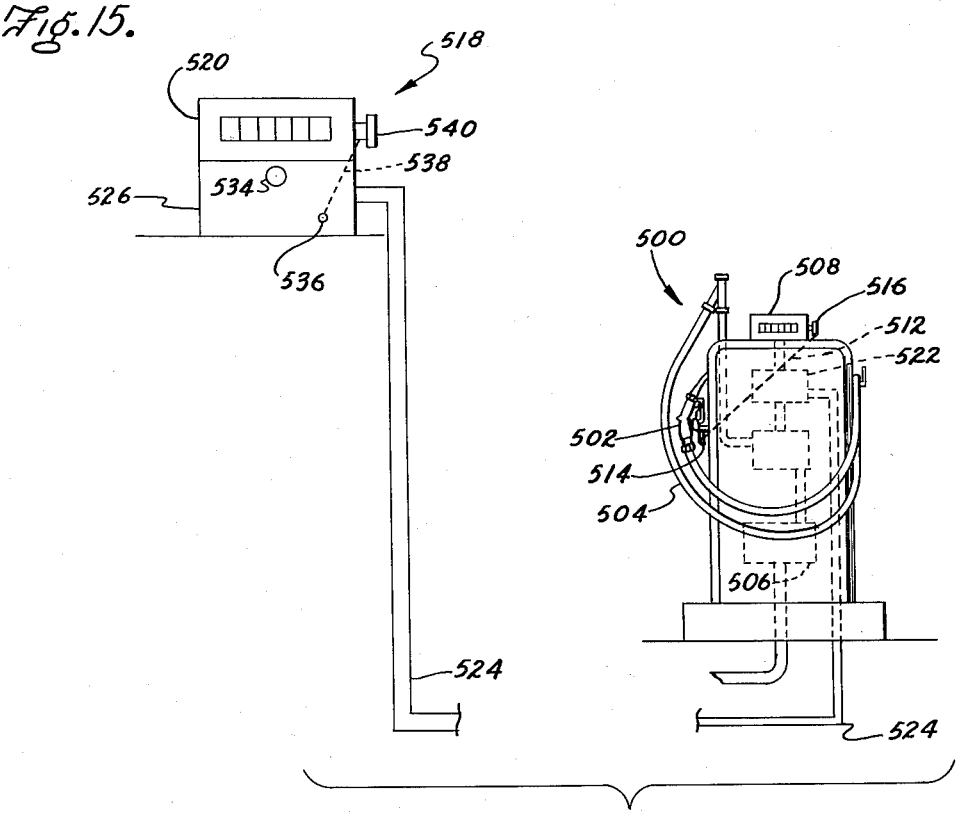
Figure 16:
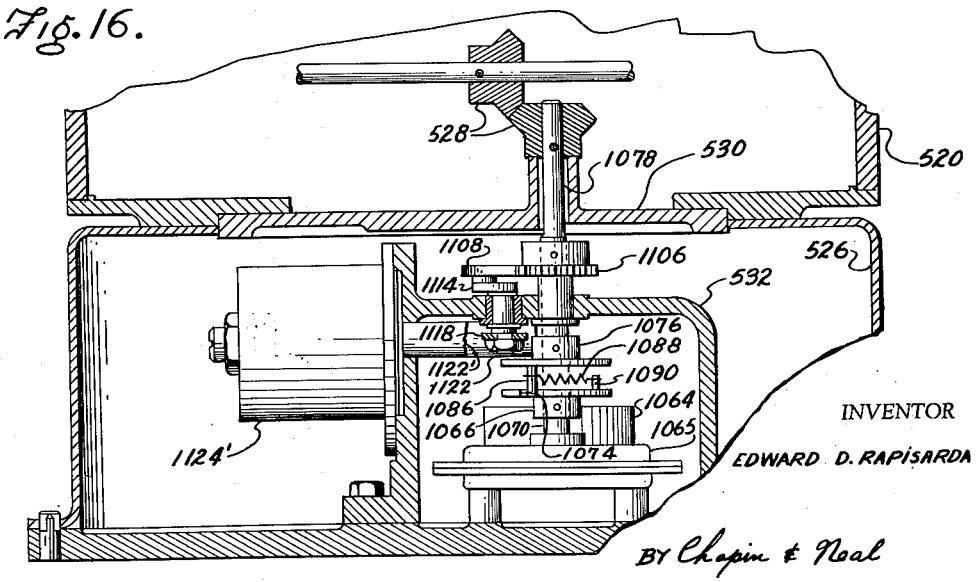

In the drawings:
FIG. 1 diagrammatically illustrates the manner in which the present invention may be employed in a retail gasoline station;
FIG. 2 is a fragmentary section, on an enlarged scale, taken on line II—II in FIG. 1;
FIG. 3 is a section taken through the register seen in FIG. 1, on an enlarged scale, showing the gallon wheels and drive mechanism therefor;
FIG. 4 is a section taken on line IV—IV in FIG. 3 with certain parts moved to different positions;

FIG. 5 is a section taken on line V—V in FIG. 3;
FIG. 6 is a section taken on line VI—VI in FIG. 4;
FIG. 7 is a section taken on line VII—VII in FIG. 3;
FIG. 8 is a section taken on line VIII—VIII in FIG. 3;
FIG. 9 is a section taken on line IX—IX in FIG. 3;
FIG. 10 is another section, on an enlarged scale, showing the control knob for the register and a nozzle supporting holster;
FIG. 11 is a view taken on line XI—XI in FIG. 10;
FIGS. 12 and 13 are views taken on line XII—XII in FIG. 10 showing different positions of switch operating and interlock elements;
FIG. 14 is a diagrammatic showing of the electrical circuit employed in connection with the apparatus of FIGS. 1–13;
FIG. 15 is a diagrammatic view, on no particular scale, of an alternate use of the present invention;
FIG. 16 is an elevation, partly in section and on an enlarged scale of a register seen in FIG. 15; and
FIG. 17 is a diagrammatic showing of the electrical circuit and mechanical interlocks employed in connection with the apparatus of FIGS. 15 and 16.

Referring first to FIG. 1, a gasoline station comprising an island 20 is located on a concrete apron 22 so that automobiles and the like may be driven to either side thereof in the usual fashion. Two dispensing units 24, 24' are mounted on the island 20 and each comprises a flexible hose 26 attached at one end to a delivery pipe 28 with a dispensing nozzle 30 attached to the other end of the hose. A register 32 is mounted on a standard 34 adjacent the end of the delivery pipe 28 and is provided with means for supporting the nozzle 30 when it is not in use and a takeup for looping the hose 26. The register is provided with a face having one opening for numeral wheels 36 showing the number of gallons delivered, another opening for numeral wheels 38 showing the price of gasoline delivered, and a third opening for numeral wheels 40 showing the cost per gallon of the gasoline. The two units are duplicates in all respects, corresponding elements of the dispensing unit at the right of the island in FIG. 1 being indicated by primed reference numerals.

An underground gasoline storage tank 42 is disposed at some remote point with a submersible pump 43 being provided to discharge gasoline therefrom through a pipe 44 to a header 45 and then to a meter 46 which is provided for each dispensing unit. The pipe 28 is connected to the discharge side of the meter 46 to complete the circuit for delivery of gasoline. It is common practice for submersible pumps of the type illustrated to be constantly driven, and to control delivery of gasoline by energizing a normally closed solenoid valve 48 which controls flow of gasoline to the meter 46. A variator 50 (as described in United States Patent No. 2,111,996) is driven by the meter 46. Conventionally the variator 50 is provided with a gallons shaft and a money shaft, not shown. The gallons shaft rotates in fixed ratio to the operation of the meter to indicate the volume of gasoline delivered. The money shaft rotates at a given ratio to the rate of operation of the meter with means being provided to adjust said given ratio in accordance with the price per gallon of the gasoline. The money shaft and the gallons shaft project above the variator into an explosionproof housing 52. Within the housing 52 means are provided for generating electrical pulses which control rotation of the gallon wheels 36 and price wheels 38 at the island 20 as will later be described in detail. Three identical metering units and discharge lines are shown with corresponding elements bearing primed reference characters and indicating a capability for servicing a plurality of dispensing points from a single station common to all the metering units.

At this point it will be noted that the meter 46 and variator 50 are located remotely of the island 20 either in a separate housing 54 or conveniently in the service station building. The island itself is uncluttered by any bulky dispensing housing normally needed to accommodate pumps, meters and variators. This overall arrangement approaches an ultimate in simplicity, which is further enhanced by a single control knob 56 which is rotated between "off" and "on" positions to control all operations in normal use. Movement of the knob 56 to its "on" position first zeroes the gallons wheels 36 and price wheels 38 and thereafter energizes solenoid valve 48 to pressurize gasoline for delivery from the nozzle 30. Further, when the knob 56 is in its "on" position interlock means are provided for preventing the nozzle from being disposed in its accustomed location on the register 32 thus deterring an unscrupulous operator from beginning a delivery without first zeroing the register 32. As a delivery is being made the electric impulses created by the means in box 52 are transmitted by wires in a conduit 58 to means within the register 32, for rotating the gallons wheels 36 and price wheels 38 in conformity with the rate of operation of the money and gallons shafts of the variator 50. When a delivery is completed, the knob 56 is turned to its "off" position, the solenoid valve 48 is deenergized preventing further delivery of gasoline, and the interlocking means are disposed so as to permit the nozzle 30 to be placed in its accustomed location. The gallons wheels 36 and price wheels 38 will continue to reflect the amounts of the previous delivery. However, these wheels may be zeroed without removing the nozzle 30 from the register 32 and in any event must be zeroed before the solenoid valve 38 can be reenergized for a subsequent delivery.

As herein illustratively shown, the novel means for driving the gallons wheels 36 and price wheels 38 are separate and distinct except that both are controlled by the variator 50. One driving means is conformed to rotation of the variator gallons shaft and the other is conformed to rotation of the variator money shaft. However, these means, aside from there being three gallons wheels and four price wheels, are identical in all respects and hence only the drive means for the gallons wheels will be given.

Referring now to FIG. 3, the register 32 has an internal frame comprising an upstanding plate 62 on which is mounted a reversible, capacitor start and run motor 64 for driving the wheels 36. The motor 64 drives a reducing gear train, within casing 65, having an output shaft 70 (see also FIGS. 4 and 7). A coupling member 66 is secured by a set screw 68 to the output or driving shaft 70 and comprises a flange 72 having a slot 74 (FIG. 7) of limited angular extent, in the order of 50°. A second coupling member 76 is secured by set screw 77 to an aligned shaft 78 which is journaled on frame plates 80 and 82 (FIG. 3). The coupling member 76 comprises a flange 84 from which a pin 86 projects into the slot 74 of the first coupling member 66 (FIGS. 3, 4 and 7). When the motor 64 is energized for delivery of gasoline, one edge of slot 74 bears against pin 86 tending to rotate the second coupling member 76 and shaft 78 in a forward or counterclockwise direction as indicated in FIG. 7. A tension spring 88 extends between pin 86 and a pin 90 projecting from flange 72. The spring 88 also tends to rotate the shaft 78 in the forward direction.

Free or uncontrolled "forward" rotation of the shaft 78 is prevented by the arrangement of parts now to be described. A ratchet wheel 92 (FIGS. 3, 4 and 5) is secured to shaft 78 by a set screw 94. A pair of pawls 96 are pivotally mounted on studs 98 projecting from a carrier 100. A torsion spring 102 is coiled about each stud 98 with one of its ends captured by a hole in the carrier 100 (FIG. 5) and its other end bearing against the associated pawl 96 and urging it into engagement with the ratchet wheel 92.

Carrier 100 (FIG. 4) is angularly fixed on a hub 104 by pins 105, with the hub 104 being freely rotatable relative to the shaft 78. An escapement wheel 106 is also secured on the hub 104 by pins 105 and its movement is controlled by an escapement release member 108 (FIGS. 4 and 6) provided with a pair of spaced spurs 110. The release member 108 is riveted to a stud 112 projecting from a rocker 114 which is journaled on the frame plate 80. The rocker 114 is held fast axially of the plate 80 by a snap ring 116 (FIG. 4). The outer end of the rocker arm is slabbed off at 115 (FIG. 6) and is received by a correspondingly formed opening in a lever 118 (FIGS. 3, 4 and 6). The lever 118 is secured to rocker 114 by a nut 119 and each of its ends is pivotally connected by pins 120 to solenoid plungers 122, 122' extending upwardly from solenoids 124, 124'.

The structure thus far described provides, when energized for delivery of gasoline, a force from motor 64 tending at all times to rotate shaft 78 in a forward direction. Rotation of the shaft 78 is conformed to the rate of operation of the gallons shaft of the variator by the electric pulse producing means housed within box 52 which means alternately energizes solenoids 124, 124' to oscillate lever 118 and the escapement release 108 thereby providing for incremental rotation of shaft 78 in a forward direction. The described coupling arrangement including spring 88 is such that the shaft 78 is at least in part rotated by this spring since its mass is small and its rate of acceleration rapid as compared to the motor 64. Thus the pin 86 tends to float in the slot 74 with energy being stored in the spring 88 as the shaft 78 is brought to rest after each increment of rotation and the motor 64 is stalled each time.

Referring to FIG. 2, the pulse producing means will now be described. A multi-lobed cam 300 is driven by the gallons shaft (not shown) of the variator 50. Two sets of switch contacts 302, 302' are mounted in fixed angular relation to the cam 300. The contacts 302, 302' comprise a movable arm having a finger 304, 304' yieldingly engaging the cam 300. The contacts are arranged relative to the cam 300 so that they are alternately opened and closed as the cam 300 rotates. The shape of the cam is also arranged so that there is no overlapping in the closure time of the contacts 302, 302'. Thus one set of contacts opens before the other set of contacts is closed.

It is convenient to rotate the cam 300 one revolution for each cam of gasoline passing through the meter 46. There are 10 lobes or rises on the cam 300 so that each time one of the contacts 302, 302' is closed, $\frac{1}{20}$ of a gallon has been delivered. Referring back to the escapement wheel 106 (FIG. 6), it will be seen that ten equispaced teeth are provided. With these relationships, each time one of the contacts 302 or 302' is closed either the solenoid plunger 122 or 122' will be lowered and the escapement wheel 106 and shaft 78 will rotate $\frac{1}{20}$ of a revolution which in turn will reflect delivery of $\frac{1}{20}$ of a gallon of gasoline.

It is possible to eliminate one of the contacts 302, 302' and employ a spring to pull downwardly on one end of the lever 118 instead of using a positive pull in each direction of oscillation of the lever 118. Such an arrangement, while practical, is not preferred since energy may be stored in such a spring return system which, would result in inaccuracies in conforming rotation of the shaft 78 to the rotation of the gallons shaft of the variator.

Before leaving FIG. 2, it will be noted that a second multi-lobed cam 308 is driven by the money shaft of the variator and similar means are employed to produce electrical pulses for conforming rotation of the price wheels 38 in much the same fashion.

Referring now to the gallons wheels 36 (FIG. 3) each wheel comprises a a hub 132 having an integrally cast flange 134 with a numeral bearing rim 136 attached to the flange 134. For the sake of clarity the numerals on the wheels 36 have been omitted. The fractions wheel 36a is held fast on shaft 78 by pin 126 passing through the hub 132. The hubs 132 of units wheel 36b and tens wheel 36c are freely rotatable relative to shaft 78. As explained, shaft 78 is rotated in a forward direction in increments representing 1/20 of a gallon. Wheel 36a will likewise be rotated and is provided with indicia representing tenths of a gallon which are registered with the opening in the face of the register. Upon completion of one revolution of wheel 36a a conventional Geneva-type motion transfer wheel 128 will rotate the units wheel 36b to bring the next higher numeral thereon into registration with the opening in the dial face of the register 32. The transfer wheel 128 as well as a second transfer wheel 128' are mounted on a shaft 130 extending between the plates 80 and 82. Upon the wheel 36b being rotated a full revolution, the wheel 36c will be rotated by the transfer wheel 128' to bring its next higher numeral into registration with the dial face opening.

Each of the wheels 36b and 36c is identically constructed and further comprises a sheet metal gear 138 (FIGS. 3 and 8) meshing with the transfer wheel 128. The gear 138 is rotatably mounted on the hub 132 with a ratchet wheel 140 secured to its inner surface. Pawls 142 (only one is shown) pivotally mounted relative to the flange 134 yieldingly engage opposite sides of the ratchet wheel 140 (FIG. 8) so that as the gear 138 is rotated in a forward direction by transfer wheels 128 or 128' the wheel 36b or 36c will be positively rotated in that same direction and yet the wheel 36b or 36c may be rotated when being zeroed, as later explained, in opposite or reverse direction with the gear 138 held stationary by the Geneva means including wheels 128.

Retaining plates 144 are respectively mounted in fixed angular relation each to a wheel by means of cooperating notches and recesses on the end of hub 132, and held in place by the outer end of the hub being flared outwardly. A dog 146 is pivotally mounted in a socket formed in the plate 144 and is maintained in an upright position relative thereto by a leaf spring 148. A lug 150 projects towards the left (FIG. 3) from the flanges 134 of each of the wheels 36a, 36b, 36c. The lugs 150 of the wheels 36a and 36b are a part of the known Geneva transfer means and further function in the zeroing operation. Thus it is that these lugs extend respectively into the planes of the dogs 146 with the result that they will "click" freely past the dogs 146 in a forward direction. However, when the wheel 36a is rotated in a reverse direction its lug 150 will abut against the adjacent dog 146 and positively drive the wheel 36b in reverse direction in registered relation to the wheel 36a. Likewise the lug 150 of wheel 36b is positioned to drive the wheel 36c in a reverse direction and in registered relation. Registered relation as herein used means that like numerals are horizontally aligned on the wheels 36a, 36b and 36c.

To the left of wheel 36c (FIG. 3), a cam plate 152 is rotatable relative to shaft 78 but limited as to its rotative movement relative to frame plate 82. A retaining plate 151 (FIG. 9) is mounted on cam 152 and supports a dog 153 which is held in an upright position by spring 155. Lug 150 of wheel 36c will either "click" by or abut the dog 153 dependent upon whether the wheel is rotating in forward or reverse direction. The cam plate 152 is formed with a lobe 154 which is adapted to actuate a limit switch 156. The limit switch 156 is secured to plate 82 with a sheet metal bracket 157 embracing the switch and having an upstanding finger 158 therefrom interposed between the cam plate 152 and the plunger 160 of switch 156. The left hand end of shaft 78 is actually journaled on a pad 161 (FIG. 3) which in turn is secured to the plate 82. For adjustment purposes the pad 161 may be rotated about its central axis to a desired position relative to plate 82. A pin 162 projects from pad 161 into an opening 164 (FIG. 9) in cam plate 152 thereby limiting angular movement of the cam plate relative to the frame plate 82. A tension spring 166 extends between a pin 167 on cam plate 152 and a pin 168 projecting from plate 82 to yieldingly maintain the cam plate in its illustrated full line position.

Operation of the register 32 may be summarized as follows. When the dispensing unit is set to deliver gasoline, i.e. the operating knob 56 referred to in the description in FIG. 1 is in its "on" position, the motor 64 is energized and tends to rotate the wheel shaft 78 in the forward direction and the solenoid 48 is open so that gasoline is pressurized up to the nozzle 30 in readiness for delivery of gasoline. As gasoline is dispensed the contacts 302, 302' (FIG. 2) are alternately closed to produce electrical pulses which alternately energize solenoid 124, 124' (FIG. 3). The lever 118 (FIG. 6) is oscillated and with it the escapement release member 108 so that the escapement wheel 106 and the shaft 78 will be rotated in increments corresponding to 1/20 of a gallon of gasoline delivered. The fractions wheel 36a which is pinned to shaft 78 is likewise rotated. The units and tens gallons wheels 36b and 36c are then rotated by the Geneva gear means including the transfer wheels 128, 128' so that the amount of gasoline delivered is correctly reflected by the position of these wheels relative to the opening in the dial face of the register 32.

After the delivery of gasoline is completed and before a subsequent delivery is made, the gallons wheels 36 are zeroed by first turning the control knob 56 to its "off" position to deenergize the solenoid valve 48 and then moving the control knob 56 back towards its "on" position as will more fully be explained hereinafter. The important point for the moment being that the motor 64 is actuated to drive the wheel shaft 78 in reverse direction. When the motor 64 is so energized the shaft 70 (FIG. 7) rotates in reverse direction and the opposite side of slot 74 bears against pin 86 to directly drive the shaft 78 in reverse direction through the pin 86. The one-way drive, including ratchet wheel 92 and pawls 96 permits the shaft 78 to freely rotate in a reverse direction while the escapement mechanism, including wheel 106 and release member 108 remain stationary. Further, to insure a predetermined relationship between the release member 108 and the escapement wheel 106, there is provided means for positively preventing reverse rotation of the escapement wheel 106. These means take the form of spring fingers 169 (FIG. 6) mounted on posts 171 which project from the frame plate 80. The spring fingers 169 are arranged to engage the teeth of wheel 106 to prevent reverse movement of the wheel 106 regardless of which of the spurs 110 of release member 108 is in engagement with the wheel 106 when the reversing or zeroing operation is started.

The wheel 36a is thus rotated in reverse direction and as it is so rotated its lug 150 will engage the dog 146 (FIG. 8) of wheel 36b so that the latter wheel will also be rotated in reverse direction. Lug 150 of wheel 36b will then engage dog 146 of wheel 36c and likewise rotate that wheel in reverse direction with all of the wheels being registered. Reverse rotation of wheels 36b and 36c is possible by reason of the one-way drive including pawls 142 and ratchet 140 (FIG. 8). Thereafter the lug 150 of wheel 36c will engage dog 153 (FIG. 9) when the zero figures of all of the wheels have been brought into alignment with the opening in the dial face of register 32. This zeroed condition is then indicated by a slight rotative movement of cam 152 (FIG. 9) as limited by pin 162 and opening 164. This slight rotative movement is sufficient to open switch 156 which is arranged to deenergize motor 64. Thereafter spring 166 returns the cam 152 to the illustrated full line position and through the dogs 153 and 146, the wheels 36 are returned to an accurate zero position in readiness for subsequent delivery of gasoline.

It will, of course, be appreciated that a duplicate set of gallons wheels could be provided on the opposite side of the register 32. These duplicate gallons wheels could be mounted on a shaft corresponding to shaft 78 in essentially the manner described. The shaft for the duplicate wheels may then be coupled to the shaft 78 and the rotation of the duplicate gallons wheels conformed to the rotation of the wheels 36.

Before describing the electrical control circuit, reference will be made to FIGS. 10–13 showing the details of knob 56 which is employed to turn the dispensing unit on and off and reset the register 32. Knob 56 is rotatably mounted on one end of a shaft 400 which is journaled on the front face of the register 32. An interlock lug 402 is secured to the other end of shaft 400 and disposed within a holster 404 for receiving the spout 406 of the dispensing nozzle 30. The holster 404 is disposed rearwardly of the gallons wheels previously described and provides the only means on the register for supporting the nozzle 30 when it is not in use. Thus, there is only one accustomed location for the nozzle 30 and even the more unwary purchaser will be alerted if the nozzle is not taken from its accustomed location when a delivery of gasoline is to be made.

A cam member 408 is secured to the shaft 400 and is drivingly coupled to the knob 56 by a pin 409 projecting from the latter member and entering a radial slot 410 formed in cam 408 with a radial expanse of some 20°. Two appropriately mounted micro-switches 412 and 414 are angularly spaced and arranged to be actuated by the cam 408. Micro-switch 412 is the reset switch which, when closed, will effect resetting or zeroing of the register 32. Micro-switch 414 is the actuating or operating switch which, when closed, will effect energization of solenoid valve 48 so that gasoline will be pressurized for delivery.

The various elements just described are shown in the "off" position of the knob 56 in FIGS. 10–12. In normal use the operator will first remove the nozzle 30 (spout 406 moves toward the left in FIGS. 10 and 11) from the holster 404 and then rotate the knob 56 in a clockwise direction. During the first 20° of such rotation the pin 409 will engage the end of slot 410 and then after 10° of further movement cam 408 will be rotated to bring its lobe 416 to position B (FIG. 12) and thereby close reset switch 412. Closure of the reset switch results in zeroing of the register 32 as explained above. At this point note will be taken of the actuating means for the reset switch 412. Tabs 418 (FIG. 13) are provided on either side of the switch and are bridged by a pin 420. A lever 422 overlies the switch 412 and projects into obstructive relation with the flat face of lobe 416. A relatively strong spring 424 urges the lever 422 against pin 420 and a relatively weak tension spring 426 holds the other end of this spring against the spring loaded plunger 428 of the switch 412. Thus as lobe 416 is moved to position B, lever 422 is pivoted about pin 420 to depress plunger 428 and close the contacts of switch 412.

Further rotation of the knob 56 another 15° will fully bring interlock 402 up into the holster 404 a distance sufficient to prevent the spout 406 from being introduced therein to hang up the nozzle 30. At the same time a toggle arrangement 430 will be on dead center. The toggle 430 (FIGS. 12 and 13) comprises a shaft 432 having a split upper end embracing the cam 408 and connected thereto by a pin 434. The shaft 432 is slidable in a rocking member 436 which comprises an appropriately journaled shaft 438 spaced immediately beneath the shaft 400.

Turning the knob 56 a few more degrees in a clockwise direction will permit the toggle 430 to give a snap action which will bring the cam 408 to the position illustrated in FIG. 13. Operating switch 414 is now closed by cam rise 440 but only after the toggle 430 passes over dead center. The operator is now free to dispense gasoline but so long as gasoline is pressurized for delivery (when switch 414 is closed) interlock 402 prevents the nozzle 30 from being hung in its accustomed location. This is illustrated by phantom position C in FIG. 11.

After a delivery of gasoline is finished the operator will turn the knob 56 in a counterclockwise direction to its "off" position. In doing this the switch 414 will first be opened to prevent further delivery of gasoline. Then the toggle 430 after passing over dead center will snap the cam 408 to its "off" position. As this occurs the interlock 402 will be lowered to again permit the spout 406 to fully enter the holster 404 as nozzle 30 is hung in its usual location. The actuating means described for switch 412 is so arranged that it will not be closed when the cam rise 416 rotates past it in a counterclockwise direction. Thus after the nozzle is hung up the register 32 will indicate the amount of the sale.

However, provision is made for zeroing the register without necessarily removing the spout 406 from the holster 404. Thus it will be seen that interlock 402 is free to move to position B (FIG. 11) which position corresponds to position B of cam rise 416 (FIG. 12) wherein reset switch 412 is closed. It is, of course, apparent that in moving knob 56 from its "off" to its "on" position that the reset switch 412 will necessarily be closed before the operating switch 414 is closed.

In FIG. 14 the electrical circuit is shown for the above described apparatus. A pair of lines 172, 174 are connected to a source of alternating current, say 110 volts, 60 cycle, with a master control switch 176 interposed in the line 172. The switch 176 is preferably located inside the service station building where it may be under the control of the person responsible for operation of the station. Wires 172, 174 extend to electrical elements most conveniently mounted within the register 32 as indicated by the dotted outline. These elements comprise a first relay R1, the coil of which is connected across lines 172, 174 by wires 178, 180 with the operating switch 414 interposed in wire 178. A second relay R2 is connected across lines 172, 174 by wires 182, 184, with the reset switch 412 interposed in wire 184. The contacts of relays R1 and R2 are diagrammatically shown as part of a complete relay, but for sake of clarity are also shown in the circuit as they are electrically connected, this in a sense represents a duplicate showing of each set of relay contacts.

With the knob 56 in its "on" position, relay R1 is energized as the operating switch 414 is closed (see FIG. 13). As a result, the primary 185 of transformer T is energized through contacts R1–1, R1–2 respectively interposed in wires 186, 188 which in turn are respectively connected to the power lines 172, 174. At the same time a circuit is completed through wire 188, contacts R1–2, wire 190, normally closed contacts R2–1, wire 192, contacts R1–1 and wire 186 to energize solenoid valve 48 thereby pressurizing gasoline for delivery. It is to be understood that conventional means (not shown) are employed to energize the motor for pump 43 seen in FIG. 1. It will, of course, be appreciated that a pump motor could be substituted for the solenoid valve 48 where individual pumping units are employed for each dispensing unit.

Transformer T serves two functions, first to energize the motor 64, and second to provide a power source for energizing solenoids 124, 124' (see also FIG. 3) to oscillate the escapement release member 108 (FIG. 6). The transformer secondary 194 is provided with a center tap common wire 196 and end wires 198 connected to semiconductors or rectifiers 200 to provide a full-wave rectifier, which supplies direct current to wire 202 with condenser 204 serving as a filter. Wire 202 extends to switches 302, 302' in the explosion-proof housing 52 (see also FIG. 1) which switches are alternately opened and closed to produce electrical pulses which are transmitted through wires 206, 206' to solenoids 124, 124', with the circuit back to the common wire 196 being completed through normally closed contacts R2–2. Condensers 207 and resistors 209 provide arc suppressing means for the switches 302, 302′ to further minimize the possibility of an explosion hazard.

The motor 64 is provided with a terminal C to which the common wire 196 is connected. The circuit for driving motor 64 in a forward direction is completed from a secondary tap wire 208 through normally closed contacts R2–3 to motor terminal F. Provision is made for reverse rotation of the motor 64 by another secondary tap wire 210 which is arranged to be connected to the motor terminal R by means of normally open relay contacts R2–4. It will be noted that a somewhat greater voltage is to be impressed on the reverse coil of motor 64 than on its forward coil since it is desired for the reset action to be as fast as possible. On the other hand the motor will be stalled during a considerable portion of its operation in the forward direction making a lower voltage desirable.

After a delivery of gasoline is completed, the knob 56, is turned to its "off" position and the operating switch 414 is thereby opened and relay R1 deenergized. Also solenoid valve 48 and transformer T are deenergized. Before a subsequent delivery of gasoline may be made, the reset switch 412 must necessarily be closed as explained in connection with FIGS. 9–13. It will be seen that upon closure of switch 412 relay R2 will be energized and further that only a momentary closure of switch 412 is required since that switch is by-passed by hold-in contacts R2–5. It will next be noted that relay R1 is then energized as contacts R2–6, by-passing operating-switch 414, are closed. Transformer T is now energized but contacts R2–1 are open so that solenoid valve 48 remains deenergized. Also contacts R2–2 are open so that there is no chance of any momentary closure of the solenoids 124 or 124′. Contacts R2–3 are open and contacts R2–4 are closed whereby motor 64 will rotate in reverse direction to zero the wheels 36. When the wheels 36 are zeroed cam 152 (FIG. 9) will be shifted to open limit switch 156 thereby deenergizing relay R2 to clear the way for a subsequent delivery of gasoline.

If the knob 56 has been moved from its "off" to its "on" position in a single motion, switch 414 will already be closed and upon deenergization of relay R2 the circuit will automatically revert to the above described condition for delivery of gasoline.

It will, of course, be appreciated that other corresponding relays may be and are provided and actuated by the switches 414 and 412 to control rotation of the price wheels 38 in essentially an identical fashion.

Referring now to FIG. 15, an alternate embodiment of the invention will be described. This embodiment is somewhat simplified and more particularly adapted to the requirements of a bulk or tank car dispersing operation. Thus, it will be seen that a dispensing unit 500 is located on an island where trucks may be driven to receive gasoline or the like. The dispensing unit comprises a nozzle 502 connected to a hose 504 leading from a pump 506 which in turn is connected to a supply of gasoline or the like. A simple register 508 is driven by a meter 510 and indicates the volume, viz. gallons, of gasoline delivered. The dispensing unit as thus far described is a commercial item and a further explanation is not required for those familiar with this art.

It is also common practice to provide a mechanical interlock, indicated diagrammatically at 512, between the handle 514 for starting the pump motor and the knob 516 for resetting the register 508. The interlock is so arranged that it prevents the nozzle 502 from being hung in its accustomed position without first turning off the pump motor and also prevents the pump motor from being reenergized unless the register is first zeroed by appropriate movement of knob 516.

Remote from the dispensing unit 500 is a monitoring station 518 comprising a register 520 the operation of which is to be conformed to the operation of the register 508. To this end, means are provided within the dispensing unit 500 for producing electrical pulses in response to the rate at which gasoline is delivered. The pulse producing means are mounted in an explosion-proof housing 522 and include a multi-lobed cam and switches (not shown in FIG. 15) which operate in much the same fashion as was described in connection with FIG. 2 above. These pulses are carried by wires within conduit 524 to means within housing 526 for driving the number wheels of register 522.

The means for driving the number wheels of register 520 comprise many parts which are identical in construction and/or function to the component parts for driving the gallons wheels 36 of the first described embodiment. These corresponding parts are identified by 1000 series reference characters and briefly described with reference to FIG. 16.

The register 520 is driven by a shaft 1078 through a pair of bevel gears 528, beyond which the construction of the meter is conventional. The shaft 1078 is journaled on an interior housing 532 with a motor 1064 tending, when energized, to drive the shaft 1078 at all times. This drive comprises a coupling member 1066 secured to the output shaft 1070 of a reducing gear train in housing 1065. A second coupling member 1076 is secured to the shaft 1078 and driven by the first coupling member. A resilient or shiftable connection is had between the members 1066 and 1076 (the former being slotted at 1074) by means of pins 1086 and 1090 and spring 1088.

An escapement wheel 1106 is secured to shaft 1078 and engaged by an escapement release member 1108 to prevent free or uncontrolled rotation of said shaft 1078. The release member 1108 is secured to one end of a rocker member 1114 which is journaled on the interior housing 532 with a lever 1118 secured to its other end. Solenoid plungers 1122, 1122′ are pinned to the outer ends of lever 1118 and are arranged to rock said lever upon solenoids 1124, 1124′ being alternately energized.

Solenoids 1124, 1124′ are energized in response to the pulse producing means at the dispensing unit 500. Thus the rate of movement of escapement latch 1108 is dependent on the rate of delivery of gasoline, as before, and this controls the rate of rotation of shaft 1078. The operation of register 520 is thus conformed to that of register 508 by appropriate gearing.

The operation of the apparatus of FIGS. 14 and 15 is as follows. The operator at the monitoring station 518 (FIG. 15) at all times, is able to survey conditions at the dispensing unit 500. Thus he is able to ascertain the amount of gasoline delivered from the register 520 and further is able to control the starting of any subsequent delivery of gasoline.

To this end the operating handle 514 of the dispensing unit is arranged to close an operating switch (not shown in FIG. 15) when the nozzle 502 is removed and the operator ready to commence delivery. Closure of the operating switch causes a signal light 534 to be illuminated at the monitoring station 518. The monitor operator is then preferably able to visually determine that an authorized operator is at the dispensing unit 500. Whereupon he momentarily closes a monitor switch 536. When this is done the operator is then free to make a delivery of gasoline in the usual fashion. When the delivery is completed the operator must swing the operating handle 514 to hang up the nozzle 502 in its usual location. In doing so the operating switch is opened preventing further delivery of gasoline. The amount of gasoline delivered may then be recorded from either or both of the registers 508 and 512.

Now, before a subsequent delivery can be made, the interlock means 512 require that the register 508 must be zeroed before the handle 514 is effective to close the operating switch. Also an interlock 533 is provided between the monitor switch 536 and knob 540 for resetting register 522. The interlock 533 is arranged to prevent a subsequent closure of switch 536 prior to the register 520 being zeroed by appropriate movement of knob 540. The interlock 538, like the interlock 514, in itself involves a simple matter of mechanical linkages which do not require a detailed description.

Thus, it is that both the registers 508 and 522 must be zeroed after each delivery of gasoline before a subsequent delivery can be made.

The electrical circuitry for achieving the above ends is seen in FIG. 17. A pair of wires 542, 544 are connected across an appropriate electrical current source, say 110 volt, 60 cycle. Wires 546, 548 extend respectively from the power lines 542, 544 to the coil of a relay R3. Again the relay contacts are duplicated in that they are shown with the relay R3 and also as they are electrically connected in the circuit.

The operating switch, numbered 550, is interposed in line 546, while the monitor switch 536 is interposed in line 548. Thus both switches 536 and 550 must be closed in order to energize relay R3. The indicating light 534 is connected across switch 550 between lines 544 and 546 so that it will be illuminated upon closure of the operating switch 550 thereby alerting the monitor operator that a delivery of gasoline is desired. Monitor switch 536 may then be momentarily closed to energize relay R3 which is maintained energized after release of switch 536 by hold-in contacts R3-1.

Closure of relay contacts R3-2 and R3-3 completes a circuit through lines 552 and 554 to simultaneously energize the motor 556 for the dispenser pump and a transformer T2. The secondary of transformer T2 is provided with a center tap common wire 558 and end wires 560 connected to semi-conductors or rectifiers 562 which provide a full-wave rectifier, the output of which is coupled to wire 564 and filtered by condenser 566. The wire 564 is connected to switches 568, 568' which are alternately closed by a multilobed cam rotated by the meter shaft of the dispenser unit to produce electrical pulses which alternately energize solenoids 1124, 1124'. Condensers 570 and resistors 572 provide spark-suppressing means. The circuit for solenoids 1124, 1124' is completed back to the common wire 558 by way of wire 574.

A secondary tap wire 576 is connected to one side of the motor 1064. The other side of the motor is connected to the common wire 558 by wire 578. The motor 1064 is again a capacitor-start, capacitor-run motor capable of being stalled a good portion of the time it is energized.

The interlocks 512 and 538 diagrammatically illustrate that switches 550 and 536 respectively cannot be reclosed without zeroing the registers 508 and 520.

It will, of course, be apparent that the described embodiments are capable of modification within the spirit and scope of the invention as will be measured by the following claims.

Having thus described the invention, what is claimed as novel and desired to be secured by Letters Patent of the United States is:

1. Apparatus comprising an element rotatable in accordance with a measured condition, a rotatable remote indicator, means for conforming rotation of said indicator with rotation of said rotatable element, said conforming means including an electric motor drive for constantly exerting a torque force on said indicator, means for coupling said motor drive to said indicator, means for normally restraining rotation of said indicator thereby stalling said motor, said coupling means comprising a pair of rotatably shiftable elements having elements engageable when said motor is stalled and further comprising spring means for storing energy when said motor is stalled and exerting a torque force on said indicator, said restraining means being temporarily releasable to permit incremental rotation of said indicator at least partially as a result of said spring means, and means for releasing said restraining means at a rate proportionate to the rate of rotation of said rotatable element.

2. Apparatus comprising an element rotatable in accordance with a measured condition, a rotatable remote indicator, means for conforming rotation of said indicator with rotation of said rotatable element, said conforming means including a motor drive having an output shaft for constantly exerting a torque force on said indicator, a shaft on which said indicator is mounted, means for coupling said output shaft and said indicator shaft, means for normally restraining rotation of said indicator thereby stalling said motor, said coupling means comprising a pair of coupling members respectively secured to said shafts, a pin extending from one of said members and the other of said members having a slot of limited angular extent for receiving said pin, one edge of said slot bearing against said pin when said motor is stalled, said coupling means further comprising a tension spring interconnecting said coupling elements and extensible when said motor is stalled to store energy for exerting a torque force on said indicator shaft in the same direction as said motor drive, said restraining means being temporarily releasable to permit incremental rotation of said indicator, at least partially, as a result of said spring means, and means for moving said last-named means at a rate proportionate to the rate of rotation of said rotatable element.

3. Apparatus comprising an element rotatable in accordance with a measured condition, a rotatable remote indicator, means for conforming rotation of said indicator with rotation of said rotatable element, said conforming means including a reversible electric motor drive rotatable in forward and reverse directions, said motor drive being adapted to constantly exert a torque force on said indicator when energized for rotation in a forward direction, means for so energizing said motor, means for normally restraining rotation of said indicator in a forward direction and stalling said motor, said restraining means being temporarily releasable to permit incremental rotation of said indicator, means for moving said last-named means at a rate proportionate to the rate of rotation of said rotatable element, and means for energizing said motor drive for rotation in a reverse direction, said motor drive being coupled to said indicator to rotate same in a reverse direction and stop means for limiting reverse rotation of said indicator to a predetermined position.

4. Apparatus comprising an element rotatable in accordance with a measured condition, a rotatable remote indicator, means for conforming rotation of said indicator with rotation of said rotatable element, said conforming means including a reversible electric motor drive rotatable in forward and reverse directions, said motor drive being adapted to constantly exert a torque force on said indicator when energized for rotation in a forward direction, means for so energizing said motor, escapement means normally restraining rotation of said indicator and stalling said motor when energized for rotation in a forward direction, said escapement means including an escapement wheel and an escapement release member, one-way drive means interconnecting said escapement wheel and said indicator and preventing relative rotation between said indicator and said escapement wheel in a forward direction, means for oscillating said escapement release member to permit incremental rotation of said indicator at a rate proportionate to the rate of said rotatable element and means for energizing said motor drive for rotation in a reverse direction, said motor drive being coupled to said indicator to rotate same in a reverse direction, stop means for limiting reverse rotation of said indicator to zero same and means preventing rotation of said escapement wheel during such reverse rotation of the indicator.

5. Apparatus as in claim 4 wherein the indicator is mounted on a shaft and the motor drive is coupled to said shaft, and further wherein the one-way drive comprises a ratchet wheel secured to said shaft, a carrier mounted on said shaft, a pair of pawls pivotally mounted on said carrier and yieldingly engaging said ratchet wheel and said escapement wheel is secured in fixed angular relation to said carrier.

6. Apparatus for the delivery of gasoline or the like comprising a liquid delivery line, a meter for measuring the quantity of gasoline delivered, a register having a numeral wheel, a motor drive having an output shaft for constantly exerting a torque force on said numeral wheel, a shaft on which said numeral wheel is mounted, means for coupling said output shaft and said indicator shaft, escapement means normally restraining rotation of said indicator and stalling said motor, said coupling means comprising a pair of coupling members respectively secured to said shafts, a pin extending from one of said members and the other of said members having a slot of limited angular extent for receiving said pin, one edge of said slot bearing against said pin when said motor is stalled, said coupling means further comprising a tension spring interconnecting said coupling elements and extensible when said motor is stalled to store energy for exerting a torque force on said numeral wheel shaft in the same direction as said motor drive, said escapement means including an escapement wheel rotatable with said numeral wheel, and an escapement release member, a lever for oscillating said escapement release member, a pair of solenoids, the plungers of which are respectively secured to opposite ends of said lever, pulse producing means for alternately energizing said solenoids to oscillate said escapement release member and permit incremental rotation of said indicator, said pulse producing means comprising a pair of switches arranged to be alternately opened and closed in response to rotation of said meter to conform rotation of said numeral wheel to rotation of said meter.

7. Apparatus for the delivery of gasoline or the like, comprising a liquid delivery line, a meter for measuring the quantity of gasoline delivered, a register having a numeral wheel, a motor rotatable in forward and reverse directions, said motor drive having an output shaft for constantly exerting a torque force on said indicator when energized for rotation in a forward direction, means for so energizing said motor, a shaft on which said numeral wheel is secured, means for coupling said output shaft and said indicator shaft, escapement means normally restraining rotation of said indicator and stalling said motor when energized for rotation in a forward direction, said coupling means comprising a pair of coupling members respectively secured to said shafts, a pin extending from one of said members and the other of said members having a slot of limited angular extension for receiving said pin, one edge of said slot bearing against said pin when said motor is stalled, said coupling means further comprising a tension spring interconnecting said coupling members and extensible when said motor is stalled to store energy for exerting a torque force on said numeral wheel shaft in a forward direction, said escapement means including an escapement wheel and an escapement release member, one-way drive means interconnecting said escapement wheel and said numeral wheel shaft and preventing relative rotation between said shaft and said escapement wheel in a forward direction, means for oscillating said escapement release member to permit incremental rotation of said indicator at a rate proportionate to the rate of rotation of said meter to thereby conform rotation of said numeral wheel to rotation of said meter and means for energizing said motor drive for rotation in a reverse direction whereby the numeral wheel shaft will be rotated in a reverse direction as said pin is engaged by the opposite side of the slot in said coupling member, stop means for limiting reverse rotation of said numeral wheel shaft to zero the numeral wheel, and means preventing rotation of said escapement wheel during such reverse rotation of the numeral wheel.

8. Apparatus for the delivery of gasoline or the like, comprising a liquid delivery line, means for pressurizing liquid for delivery through said line, a meter for measuring the volume of liquid delivered, a dispensing unit including the terminal portion of said delivery line and a register having a set of numeral wheels, a shaft on which said wheels are mounted in side-by-side relation, motor means having an output shaft drivingly coupled to said wheel shaft and rotatable in forward and reverse directions, said motor means when energized for rotation in a forward direction at all times tending to drive said wheel shaft, means for so energizing said motor means, means for releasably preventing free rotation of said wheel shaft in a forward direction, and means operable in response to rotation of said meter for temporarily releasing said preventing means and permitting a predetermined incremental rotation of said wheel shaft, the lowest order wheel being secured to and rotatable with said wheel shaft, the higher order wheels being rotatable relative to said shaft, Geneva gear means for preventing free rotation of said higher order wheels and for rotating said higher order wheels an incremental amount upon the next lower order wheel completing a full revolution, means for energizing said motor for rotation in a reverse direction to zero said wheels, a one-way drive for coupling said preventing means to said wheel shaft and permitting free rotation of said wheel shaft relative thereto in a reverse direction, other one-way drive means for coupling said higher order wheels to said Geneva means and permitting reverse rotation of the wheels, driving means between adjacent wheels for transmitting rotation successively from the lowest order wheel to the higher order wheels in a reverse direction only, said last-named means being arranged to register the numerals of all the wheels, and stop means for limiting reverse wheel rotation thereby zeroing said wheels.

9. Apparatus as in claim 8 wherein a limit switch is provided, said limit switch being actuated in response to zeroing of said wheels, and further, wherein means are provided responsive to actuation of said limit switch for deenergizing said motor means.

10. Apparatus as in claim 9 wherein the stop means for limiting reverse rotation of said wheels comprises a cam mounted on said wheel shaft adjacent the higher order wheel, a fixed stop pin entering a slot in said cam somewhat larger than said pin, driving means between the higher order wheel and said cam for transmitting rotative movement from said highest order wheel to said cam in a reverse direction only whereby reverse rotation of said wheels will be limited by said pin, and wherein said limit switch engages a rise in said cam and is actuated by a slight rotative movement of said cam in a reverse direction, and further wherein spring means are provided to rotate said cam in a forward direction a slight amount as limited by said fixed pin upon deenergization of said motor means.

11. Apparatus as in claim 8 wherein rotatably shiftable means are provided for coupling said output shaft and said wheel shaft, said coupling comprising a pair of flanged members respectively secured to said shafts, a pin projecting from the flanged member secured to said wheel shaft and entering a slot of limited angular extent in the other of said members, and a tension spring is provided between said pin and said other flanged member which spring is disposed to tend to rotate said wheel shaft in a forward direction.

12. Apparatus for the delivery of gasoline or the like, comprising a liquid delivery line, means for pressurizing liquid for delivery through said line, a meter for measuring the volume of liquid delivered, a dispensing unit including the terminal portion of said delivery line to which a nozzle is secured and a register having a set of numeral wheels, a shaft on which said wheels are mounted in sideby-side relation, motor means having an output shaft drivingly coupled to said wheel shaft and rotatable in forward and reverse directions, said motor means when energized for rotation in a forward direction at all times tending to drive said wheel shaft, means including an operating switch for simultaneously actuating said pressurizing means and energizing said motor means for rotation in a forward direction, means for releasably preventing free rotation of said wheel shaft in a forward direction, and means operable in response to rotation of said meter for temporarily releasing said preventing means and permitting a predetermined incremental rotation of said wheel shaft, the lowest order wheel being secured to and rotatable with said wheel shaft, the higher order wheels being rotatable relative to said shaft, Geneva gear means for preventing free rotation of said higher order wheels and for rotating said higher order wheels an incremental amount upon the next lower order of wheels completing a full revolution, means including a reset switch for energizing said motor for rotation in a reverse direction to zero said wheels, a one-way drive for coupling said preventing means to said wheel shaft and permitting free rotation of said wheel shaft relative thereto in a reverse direction, other one-way drive means for coupling said higher order wheels to said Geneva means and permitting reverse rotation of the wheels, driving means between adjacent wheels for transmitting rotation successively from the lowest order wheel to the higher order wheels in a reverse direction only, said last-named means being arranged to register the numerals of all the wheels, stop means for limiting reverse wheel rotation thereby zeroing said wheels, and means preventing actuation of said operating switch prior to actuation of said reset switch.

13. Apparatus as in claim 12 wherein is provided a first relay operative in response to actuation of said operating switch and a second relay operative in response to closure of said reset switch, and further wherein the pressurizing means and the motor drive means are energized through electrical circuits which are completed through normally open contacts of said first relay and the circuit for actuating the pressurizing means includes a normally closed set of contacts of said second relay and the circuit for rotating the motor means includes a normally closed set of contacts of said second relay and a normally open set of contacts of said second relay for reverse rotation.

14. Apparatus as in claim 13 wherein a normally closed limit switch operative in response to zeroing of said wheels is provided in series with said reset switch.

15. Apparatus as in claim 11 wherein a single control knob is provided for actuating said operating switch and said reset switch, said knob being movable between "off" and "on" positions and a cam is provided which is rotatable in response to movement of said cam to actuate said operating switch in the "on" position of said knob and to momentarily actuate said reset switch in an intermediate position of said knob as the knob is moved from its "off" to its "on" position.

16. Apparatus as in claim 15 wherein a holster is provided on said register for receiving said nozzle and further wherein an interlock is rotated by said knob, said interlock being positioned to permit free insertion of said nozzle in said holster in the "off" position of said knob and interposed into said holster to prevent free insertion of said nozzle in the "on" position of said knob.

17. Apparatus as in claim 15 wherein the cam has two rises, the first rise being adapted to close said reset switch as the knob is moved from its "off" position to an intermediate position and the second rise being adapted to close said operating switch after the knob has been moved past said intermediate position and a spring urged toggle arrangement is operatively connected to said cam to rotate it fully to its "on" position once the reset switch is closed and prior to the operating switch being closed, and further wherein a rotatably shiftable connection is provided between said knob and said cam permitting free movement of said cam to its "on" position under the influence of said toggle.

18. Apparatus for the delivery of gasoline or the like comprising a liquid delivery line, means for pressurizing liquid for delivery through said line, a meter for measuring the volume of liquid delivered, a dispensing unit including the terminal portion of said delivery line with a discharge nozzle secured thereto, a holster for receiving the nozzle when it is not in use, a register having a set of numeral wheels mounted in side by-side relation, means for conforming rotation of said numeral wheels to rotation of said meter including means for rotating the higher order numeral wheels an incremental amount upon the next lower order of numeral wheel rotating a full revolution, means for zeroing said numeral wheels including a reset switch, an electrical circuit for actuating said pressurizing means and said conforming means including an operating switch, means including a single control knob for actuating said operating switch and said reset switch, said knob being movable between an "on" position and an "off" position, a shaft on which said knob is rotatably mounted, a switch actuating cam secured to said knob shaft and having two rises, said cam also being movable between "off" and "on" positions, a driving connection between said knob and said cam permitting free relative rotative movement of limited angular extent therebetween, said reset switch and said actuating switch being spaced radially outwardly from said cam and angularly spaced apart, unidirectional operating linkage actuated by one cam rise for closing said reset switch only in response to movement of said cam from its "off" position towards an intermediate position, the other cam rise being engageable with said actuating switch only after said reset switch has been closed, spring urged toggle means yieldingly holding said cam switch in its "off" and "on" positions after said toggle has passed beyond dead center relative thereto, said driving connection between said knob and said cam permitting said cam to be moved to its "off" and "on" positions with a snap action under the influence of said spring toggle, and an interlock secured to said cam knob shaft and adapted to enter said nozzle holster in the "on" position of said knob and cam to prevent insertion of said nozzle in said holster when the pressurizing means is energized, said interlock in the intermediate position of said cam being spaced away from said holster a distance sufficient to permit accommodation of said nozzle therein whereby said reset switch may be actuated without removal of said nozzle from said holster.

19. Apparatus for the delivery of gasoline or the like comprising a liquid delivery line, means for pressurizing liquid for delivery through said line, a meter for measuring the volume of liquid delivered, a dispensing unit including the terminal portion of said delivery line, a register having a set of numeral wheels mounted in side-by-side relation, means for conforming rotation of said numeral wheels to the rotation of said meter, including means for rotating the higher order numeral wheels an incremental amount upon the next lower order of numeral wheel rotating a full revolution, means for zeroing said numeral wheels including a reset switch, an electrical circuit for actuating said pressurizing means and said conforming means including an operating switch, means including a single control knob for actuating said operating switch and said reset switch, said knob being movable between an "on" position and an "off" position, a shaft on which said knob is rotatably mounted, a switch actuating cam secured to said knob shaft and having two rises, said cam also being movable between "off" and "on" positions, a driving connection between said cam and said knob permitting free relative rotative movement of limited angular extent therebetween unidirectional operating linkage actuated by one cam rise and closing said reset switch only in response to movement of said cam from its "off" position towards an intermediate position, the other cam rise being engageable with said actuating switch only after said reset switch has been closed, spring urged toggle means yieldingly holding said cam switch in its "off" and "on" positions after said toggle has passed beyond dead center relative thereto, said driving connection between said cam and said knob permitting said cam to be moved to its "off" and "on" positions with a snap action under the influence of said spring toggle.

20. Apparatus for the delivery of gasoline or the like comprising a liquid delivery line, means for pressurizing liquid for delivery through said line, a meter for measuring the volume of liquid delivered, a dispensing unit including the terminal portion of said delivery line, a register having a set of numeral wheels mounted in side-by-side relation, means for conforming rotation of said numeral wheels to the rotation of said meter, including means for rotating the higher order numeral wheels an incremental amount upon the next lower order of numeral wheel rotating a full revolution, means for zeroing said numeral wheels including a reset switch, an electrical circuit for actuating said pressurizing means and said conforming means including an operating switch, means including a single control knob for actuating said operating switch and said reset switch, said knob being movable between an "on" position and an "off" position, a switch actuating cam operatively connected to said knob and having two rises, said cam also being movable between "off" and "on" positions, unidirectional operating linkage actuated by one cam rise and closing said reset switch only in response to movement of said cam from its "off" position towards an intermediate position, the other cam rise being engageable with said actuating switch only after said reset switch has been closed.

21. Apparatus for the delivery of gasoline or the like comprising a liquid delivery line terminating at a dispensing unit, a meter at said dispensing unit for measuring the quantity of gasoline delivered, a register at the dispensing unit for indicating the amount of liquid delivered, a second register remote from said dispensing unit at a monitoring station, said second register having a numeral wheel, a motor drive for constantly exerting a torque force on the numeral wheel of the second register, means for normally restraining rotation of said numeral wheel, said motor drive being coupled in said wheel in such fashion that the motor is stalled when the numeral wheel is stopped, said restraining means being temporarily releasable to permit incremental rotation of said wheel, means operable in response to rotation of said meter for moving said restraining means at a rate proportionate to the rate of delivery of gasoline to conform rotation of said numeral wheel to rotation of said meter, means for zeroing both of said registers, a control switch at the dispensing unit, a second control switch at the monitoring station, means responsive only to simultaneous closure of both control switches for actuating said pressurizing means, means for preventing closure of the first control switch prior to zeroing of the first register and means preventing closure of the second control switch prior to zeroing of the second register.

22. Apparatus for the delivery of gasoline or the like comprising a liquid delivery line terminating at a dispensing unit, means for pressurizing liquid for delivery, a meter at said dispensing unit for measuring the amount of liquid delivered, a register at the dispensing unit for indicating the amount of liquid delivered, a second register remote from said dispensing unit at a monitoring station, means drivingly coupling both of said registers with said meter, separate means for zeroing both of said registers, a control switch at the dispensing unit, a second control switch at the monitoring station, means responsive only to simultaneous closure of both switches for actuating said pressurizing means, means for preventing closure of the first control switch prior to zeroing of the first register and means for preventing closure of the second control switch prior to zeroing of the second register.

23. Apparatus as in claim 22 wherein a signal is provided at the monitoring station and means are provided for actuating said signal in response to closure of said first control switch.

References Cited in the file of this patent

UNITED STATES PATENTS

| | | |
|---|---|---|
| 1,377,844 | McCutchen et al. | May 10, 1921 |
| 1,557,944 | Reisbach | Oct. 20, 1925 |
| 2,814,798 | Hosmer et al. | Nov. 26, 1957 |

FOREIGN PATENTS

| | | |
|---|---|---|
| 280,014 | Great Britain | Nov. 10, 1927 |